United States Patent
Vignaux

(10) Patent No.: US 9,250,342 B2
(45) Date of Patent: Feb. 2, 2016

(54) SEISMIC STREAMER FORMED OF SECTIONS COMPRISING A MAIN SHEATH COVERED WITH AN EXTERNAL SHEATH FORMED USING A THERMOPLASTIC MATERIAL LOADED WITH A BIOCIDE MATERIAL

(75) Inventor: Jean-Jacques Vignaux, Carquefou (FR)

(73) Assignee: Sercel, Carquefou (FR)

( * ) Notice: Subject to any disclaimer, the term of this patent is extended or adjusted under 35 U.S.C. 154(b) by 1467 days.

(21) Appl. No.: 12/509,266

(22) Filed: Jul. 24, 2009

(65) Prior Publication Data

US 2010/0020644 A1    Jan. 28, 2010

(30) Foreign Application Priority Data

Jul. 28, 2008    (FR) .................................... 08 04282

(51) Int. Cl.
*G01V 1/38*    (2006.01)
*G01V 1/20*    (2006.01)

(52) U.S. Cl.
CPC    *G01V 1/38* (2013.01); *G01V 1/201* (2013.01); *G01V 1/3843* (2013.01)

(58) Field of Classification Search
CPC ........ G01V 1/201; G01V 1/38; G01V 1/3843
USPC .............................................. 367/14, 16, 17
See application file for complete search history.

(56) References Cited

U.S. PATENT DOCUMENTS

| | | | | |
|---|---|---|---|---|
| 5,089,668 A | * | 2/1992 | Harvey | ...................... 174/101.5 |
| 5,141,796 A | * | 8/1992 | Harvey | .......................... 428/167 |
| 5,471,436 A | * | 11/1995 | Harvey | .......................... 367/154 |
| 5,745,436 A | * | 4/1998 | Bittleston | ........................ 367/20 |
| 6,797,743 B2 | * | 9/2004 | McDonald et al. | ............ 523/122 |
| 7,693,005 B2 | * | 4/2010 | Stenzel et al. | ................... 367/20 |
| 7,745,509 B2 | * | 6/2010 | Burton et al. | ................. 523/122 |
| 2003/0022793 A1 | | 1/2003 | Ring et al. | |
| 2004/0240806 A1 | * | 12/2004 | Lail et al. | ....................... 385/100 |
| 2006/0002234 A1 | * | 1/2006 | Lobe et al. | ..................... 367/153 |
| 2007/0201307 A1 | | 8/2007 | Lobe et al. | |
| 2011/0120745 A1 | * | 5/2011 | Booth et al. | .............. 174/113 R |

FOREIGN PATENT DOCUMENTS

EP    0478422    4/1992
EP    0560674    9/1993

OTHER PUBLICATIONS polyurethane.org, "The Many Forms and Functions of Thermoplastic Ployurethane", Oct. 3, 2006.*
polyurethane.org, "The Many Forms and Functions of Thermoplastic Ployurethane" (Oct. 3, 2006).*
polyurethane.org, "The Many Forms and Functions of Thermoplastic Polyurethane".*
Copy of French Search Report, mailed Mar. 3, 2009 (2 pages).

* cited by examiner

*Primary Examiner* — Krystine Breier
(74) *Attorney, Agent, or Firm* — Pauly, DeVries Smith & Deffner, L.L.C.

(57) ABSTRACT

Described herein is a seismic streamer formed of sections including a main sheath covered with an external sheath, wherein said external sheath is formed using a thermoplastic material loaded with a biocide material.

7 Claims, 1 Drawing Sheet

SEISMIC STREAMER FORMED OF SECTIONS COMPRISING A MAIN SHEATH COVERED WITH AN EXTERNAL SHEATH FORMED USING A THERMOPLASTIC MATERIAL LOADED WITH A BIOCIDE MATERIAL

CROSS-REFERENCE TO RELATED APPLICATIONS

This application claims the benefit of French Patent Application No. FR 08/04282, filed on Jul. 28, 2008, which application is hereby incorporated by reference in its entirety.

BACKGROUND OF THE INVENTION

1. Field of the Invention

The field of the invention is that of the acquisition of seismic data. More precisely, the invention relates to equipment for analysing sea beds. The invention in particular relates to the industry of oil prospection via the seismic method, but can be applied to any field implementing a seismic data acquisition network in a marine environment.

2. Background of the Invention

The operations of acquiring, in the field, geophysical data, conventionally implement networks of sensors. These sensors are most often hydrophones; however said operations can also implement geophones, accelerometers or any other type of sensors. The hydrophones are distributed along cables in order to form linear acoustic antennas commonly designated by the terms "streamers" or "seismic streamers". The network of seismic streamers is drawn by a seismic boat.

A seismic streamer is comprised of an assembly of individual sections instrumented with seismic sensors and associated digital-analogue conversion electronics. The seismic boat draws also one or several seismic sources comprised of an air gun network, water guns or acoustic vibrators. The pressure wave generated by the seismic source crosses the head of water and insonifies the upper layers of the sea bed. A portion of the signal is refracted by the interfaces and the inhomogeneities of the oceanic crust. The resulting acoustic signals are then detected by the seismic sensors distributed across the entire length of the seismic streamers. These acoustic signals are conditioned, digitised and retransmitted by the telemetry of the seismic streamers to the operator station located on the seismic boat where the raw data processing is carried out.

Seismic exploration campaigns can be scheduled over periods extending over several months. In addition, even in the case of unfavourable weather conditions, it is avoided, as much as possible, to return the streamers to the vessel, as the operations of returning/deploying are in practice particularly tedious and long. Indeed, each streamer has a length of several kilometers (up to 12 kilometers). This results in that seismic streamers can remain immersed in sea water for several consecutive months (with period of immersion of 6 to 12 months being frequent). Moreover, seismic streamers are generally immersed at a shallow depth (a few meters), and are generally dragged at low speed (less than or equal to 5 knots). Therefore, the tubular structure of the streamers is subject to fouling, in particular due to the proliferation, on the external layer of the seismic streamers, of microorganisms or bio-fouling.

However, these bio-fouling generate in time several disadvantages, among which:

they generate hydrodynamic flow noise: the proliferation of the bio-fouling can result in the formation on the external layer of the seismic streamers of amalgams or incrustations likely to disturb the measurements to be carried out;

they tend to increase the drag of seismic streamers and, consequently, the consumption in fuel of the boat that is tugging them;

during the winding of seismic streamers on the winches of the tug boat, the bio-fouling is deposited and fouls the equipment, and generate, after a few days, a stench due to their degradation in the air;

certain types of bio-fouling have a shell that can pierce the sheaths of the seismic streamers, which can give rise to water intake inside the seismic streamer, or to an oil leak (in the case of a seismic streamer incorporating a filling fluid, such as kerosene).

Several techniques have been proposed in prior art in order to overcome the disadvantages generated by the proliferation of bio-fouling on the external sheath of the seismic streamers.

A technique is in particular known disclosed by patent FR-2 847 987, according to which it is proposed a cleaning device of the external sheath of seismic streamers, which includes:

a tool for treating the seismic streamer, comprising rotary brushes, as well as blades to abrade the incrustations formed on the external sheath of the streamer;

means for positioning and guiding the device along the streamer.

The structure of such a device is relatively complex, in the sense where the design of the latter can be provided in order to allow for its passage on protruding elements on the tubular structure of the seismic streamers, these elements able to be comprised of floaters, or of trajectory correction devices (commonly designated by the term "bird"). Such devices have been experimented with, and then abandoned in practice, due to their cost and especially due to the fact that, most of the time, become separated from the seismic streamers and become lost in the sea beds.

"Anti-fouling" paints are also known, conventionally used on boat hulls. However, "anti-fouling" paints generally contain TBT (tributyltin) which is now well known for its toxicity. Such paints are therefore unacceptable from an environmental standpoint (pollution of sea water) as well as in relation to the safety of persons likely to be in contact with TBT paint during the manipulation of seismic streamers. Furthermore, the techniques for applying "anti-fouling" paint are hardly compatible with the technical and economical constraints linked with seismic streamers. Indeed, the techniques for applying these paints imply an operation of projecting paint onto the support. This operation of projection can be carried out by operators, using a projection gun. In this case, the projection operation is particularly long and costly due to the high number of kilometers of streamers to be treated. In addition, it is necessary to comply with a drying time for the paint, which implies storing the seismic streamers in positions that take up a considerable amount of space in order to avoid any contact of the portions of treated streamers with themselves (which excludes the winding of seismic streamers); such storage is consequently not viable economically.

It has also been proposed to carry out the projection of "anti-fouling" paint using projection rings, inside of which the tubular structure of the seismic streamers circulates, this with a paint having the capacity of drying dry in contact with water. The principle in implementing this technique consists in mounting the projection rings on the streamer tugging vessel and in carrying out the operation of treatment using rings in the open sea, the seismic streamers being stored in the water as they are treated. Such a technique thus makes it possible to overcome the problems of storage of seismic streamers during the drying phase of the paint, but implies very high implementation costs. Indeed, the equipment costs for boats are substantial in the sense where it is necessary to provide as many projection rings as there are winches for winding seismic streamers (up to twelve winches can be mounted on a seismic prospection boat). Furthermore, the logistics and means for storage of the paint are added to the other equipment present on the boat, which is already of a substantial number.

SUMMARY OF THE INVENTION

The invention in particular has for objective to overcome these disadvantages of prior art. More precisely, the invention has for objective to propose a technique making it possible for a seismic streamer to resist the fouling by bio-fouling, that can be implemented using industrial processes that are in particular less costly compared to the techniques mentioned in reference to prior art. The invention also has for objective to provide such a technique that is compatible with the mechanical constraints linked with seismic streamers, in particular in relation to their capacity of being wound. The invention also has for objective to provide such a technique that is compatible with the internal components of seismic streamers, entailing in particular components transporting an electrical current. The invention also has for objective to provide such a technique which avoids a substantial increase in weight of the seismic streamers.

These objectives, as well as others that shall appear in what follows, are achieved thanks to the invention which has for purpose a seismic streamer of the type comprising sections including a main sheath covered with an external sheath, characterised in that said external sheath is formed using a thermoplastic material loaded with a biocide material.

As such, thanks to the invention, the sections comprising the tubular elements of the seismic streamers are treated against the proliferation of bio-fouling on the external layer of these sections, the biocide material embedded in the thermoplastic material of the external sheath being distributed progressively and continuously on the surface of the external sheath. In other words, the thermoplastic material of the external sheath is permeable to the biocide material of which it is loaded.

It is understood that the invention of course allows the marine microorganisms to attach themselves on the external sheath of the seismic streamers, but also that the treatment according to the invention makes it possible to eliminate them continuously thanks to the biocide effect of the corresponding material of which is loaded the external sheath of the streamer.

Moreover, the invention proposes to cover the main sheath with a genuine sheath, not just a simple coat of "anti-fouling" paint as mentioned in reference to prior art. This results in that this sheath, made from a thermoplastic material, allows recourse to proven manufacturing techniques and which are economically viable, such as co-extrusion or bi-extrusion.

As such, the invention allows for the use of current techniques in the field of plastics transformation, avoiding the problems encountered with the application of "antifouling" paint, in particular entailing:
  treating very long sections of seismic streamers, this using industrial processes that limit human intervention;
  avoiding the immobilisation of the sections of seismic streamers, and therefore their storage, due to the fact of complying with the drying time;
  avoiding the implementation of additional equipment on the seismic streamer tug boats;
  suppressing recourse to toxic substances.

The design of the external sheath, in a thermoplastic material, allows, as mentioned hereinabove, the implementation of extrusion techniques that group together the advantages:
  easily mix granules of thermoplastic materials with a biocide material, upstream of the heating-extrusion operation;
  be particularly adapted to the carrying out of linear products of possibly long lengths;
  limit the storage constraints after extrusion;
  allow the sheathing of the sections of seismic streamers on dedicated sites independent of the tug boats;
  allow for the treatment of sections of seismic streamers according to the invention at costs that are particularly reduced in relation to the techniques of prior art.

In addition, the external sheath exerting the biocide effect is obtained without using solvents contrary to "anti-fouling" paints, which is of course an advantage from an environmental standpoint.

According to a preferred embodiment, said biocide material includes copper metal. It has indeed been shown that copper has a toxicity for phytoplankton and other marine microorganisms, without however causing toxicity for man and without generating, or hardly, any marine pollution. Note that copper exerts a biocide effect once in contact with water, due to its oxidation. According to an advantageous solution, said external sheath includes between 75 and 85% copper metal. In this way, the biocide effect of the external sheath is optimised, while still avoiding the external sheath from becoming a conductor of electricity. Preventing the external sheath from being conductive of electricity avoids any problem of galvanic coupling between the external sheath and the main sheath. Such a galvanic coupling would tend to inhibit the oxidising power of the biocide material and, consequently, the capacity of the streamer to oppose the proliferation of microorganisms.

According to another embodiment, said biocide material comprises powdered silver. Such an embodiment is also effective, but generates higher costs than recourse to a copper metal. Note that silver exerts a biocide effect once in contact with water, due to an electrolytic reaction.

Advantageously, said external sheath has a thickness of less than 1 mm. In this way, said external sheath has a thickness that is limited but that is sufficient to contain a quantity of biocide material exerting the expected effect, this while still preventing from conferring an additional rigidity to the seismic streamer, which would be detrimental to its capacity of being wound on a winch. Furthermore, an external sheath according to the invention having such thicknesses makes it possible to avoid increasing the weight of the seismic streamer excessively.

According to a first alternative embodiment, said main sheath and said external sheath include the same thermoplastic material, with the sections of seismic streamers able to be obtained in this case by a method of manufacturing according to which the external sheath and the main sheath are carried out during a step of co-extrusion.

According to a second alternative embodiment, said main sheath and said external sheath include different thermoplastic materials, a binder being disposed between said main sheath and said external sheath, with the sections of seismic streamers able to be obtained in this case by a method of manufacturing comprising:
  a step of extrusion of said main sheath;
  a step of depositing a binder on said main sheath;

a step of extrusion of said external sheath on said main sheath coated with said binder.

Other characteristics and advantages of the invention shall appear more clearly when reading the following description of two preferred embodiments of the invention, and of several of its alternatives, provided by way of examples for the purposes of information and which are non limiting, and annexed drawings.

DETAILED DESCRIPTION

The principle of the invention resides in the proposing of a seismic streamer wherein sections having a protection against bio-fouling, this protection taking the form of an external sheath added onto the main sheath of the sections, this external sheath being formed using a thermoplastic material loaded with a biocide material.

Figures 2, 3:
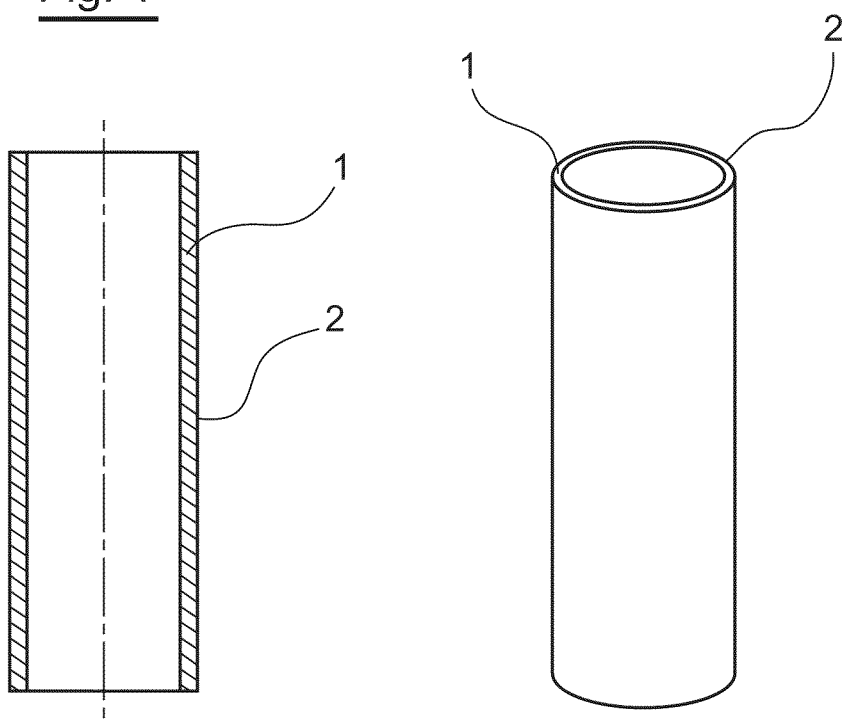
FIGS. 2 and 3 are views respectively of a cross-section and in perspective of the main and external sheaths of a section of seismic streamer according to the invention.

In reference to FIGS. 2 and 3, a section (or tubular element) of a seismic streamer includes a main sheath 1 delimiting a body wherein are mounted hydrophones, power cables and data transmission cables. An external sheath 2 is added to the main sheath 1 in such a way as to coat the latter.

Note that a section of seismic streamer generally has a length of 150 meters, the seismic streamer able to have a total length of approximately 12 kilometers.

Within the framework of the invention, the seismic streamer can be indifferently of the "fluid" type or "solid" type or any other seismic streamer filling technology such as gel. Recall that a seismic streamer of the "fluid" type incorporates in the main sheath kerosene of which the function is double: a density correction function in such a way that the density of the streamer is neutral in sea water (i.e. the streamer does not sink nor does it float or, in other words, the streamer and the sea water have the same density), and an acoustic function (the kerosene playing the role for the transmission of waves). A seismic streamer of the "solid" type is in particular differentiated from a seismic streamer of the "fluid" type in that it incorporates in the main sheath an impermeable foam (foam with closed cells) instead of kerosene.

Figure 1:
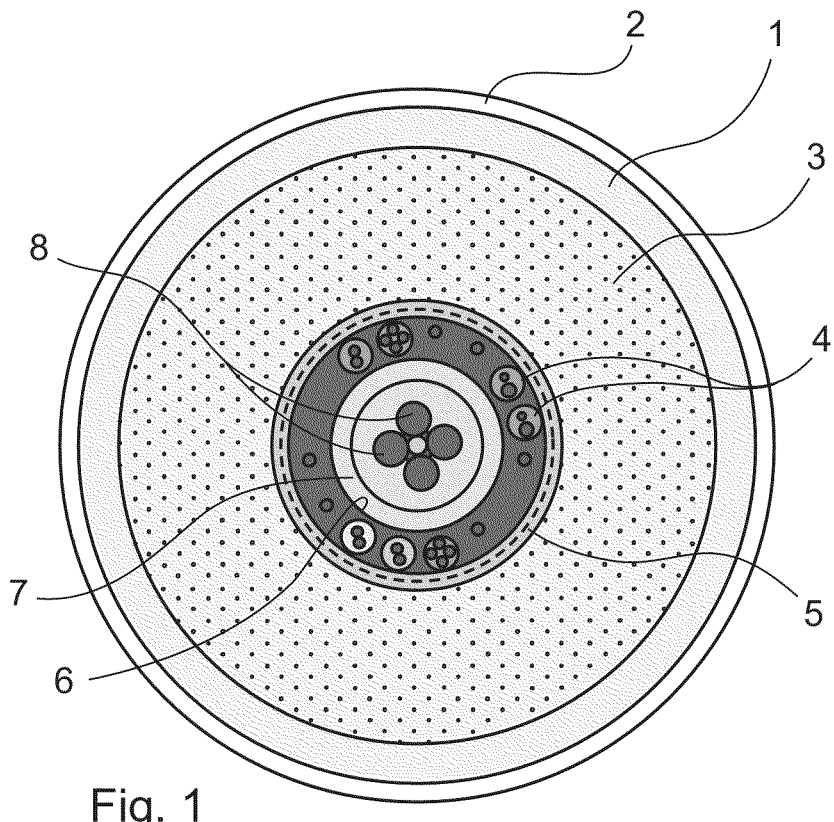
FIG. 1 is a cross-section view of the various layers and components of a section of seismic streamer according to a first embodiment of the invention.

FIG. 1 shows, as a cross-section view, a section of seismic streamer of the "solid" type. According to this embodiment, such a section includes:
  an external sheath 2;
  a main sheath 1;
  an annular volume of foam with closed cells 3 (allowing for the control of the floatability of the streamer);
  a plurality of telemetry cables 4;
  a layer 5, providing the maintaining of the telemetry cables 4;
  a tubular element made of Kevlar© 7, providing the mechanical resistance of the streamer by taking up the traction efforts;
  electrical power cables 8.

According to the principle of the invention, the external sheath 2 is formed using a thermoplastic material loaded with a biocide material. According to this embodiment, the biocide material is comprised of the powdered copper metal mixed with granules of thermoplastic material, the powdered copper metal being intended to be embedded in the thermoplastic material after fusion of the latter during a step of heating-extrusion. In addition, the external sheath comprises approximately between 75% and 85% of copper metal, which corresponds to a percentage that is optimised in order to produce the expected biocide effect while still preventing the external sheath from becoming a conductor of electricity. Note that another biocide material can be incorporated into the external sheath according to other embodiments that can be considered, such as powdered silver.

Preferentially, the external sheath 2 has a thickness of less than 1 mm, the main sheath having a thickness of between 3 mm and 5 mm. Note that this thickness of the main sheath is selected in order to sufficient mechanical protection of the various cables and components of the seismic streamer. As such, the invention makes it possible to limit the increase in rigidity and in the weight of the seismic streamer by adding to the main sheath a thin external sheath, rather than incorporating the biocide material comprised of a copper metal or of powdered silver directly in the main sheath, which would result, in light of the relatively substantial thickness of the main sheath, in a considerable increase in the rigidity and in the weight of the seismic streamer.

According to the embodiment shown in FIG. 1, the main sheath 1 and the external sheath 2 include the same thermoplastic material, here polypropylene, or polyurethane or a polyamide. According to this embodiment, the main sheath and the external sheath are carried out by co-extrusion.

According to the embodiment shown in FIG. 2, the main sheath and the external sheath include different thermoplastic materials, in the group of the following materials: polypropylene, polyurethane or polyamide. Furthermore, a binder can be disposed between the main sheath and the external sheath. In this case, the method of manufacturing of the corresponding section of seismic streamers includes the steps of:
  extrusion of the main sheath;
  depositing binder on the main sheath;
  extrusion of the external sheath on the main sheath coated with the binder.

It is understood that in one or the other of the embodiments that have just been described, the external sheath is adhered to the main sheath (by the intermediary, or not, of a binder), which avoids any later relative displacement of the external sheath and of the main sheath.

Note that after a certain period of use of a seismic streamer according to the invention, a maintenance operation may be necessary in order to reactivate the biocide effect of the corresponding material incorporated into the external sheath. For this, a simple mechanical attack of the external sheath suffices, this mechanical attack able to be carried out using a high-pressure cleaner or via a brushing technique.

The invention claimed is:

1. A seismic streamer comprising sections including:
  a main sheath formed using a thermoplastic material,
  an external sheath, formed using a thermoplastic material loaded with a biocide material, and
  a binder being disposed between the main sheath and the external sheath,
  wherein the main sheath is covered with the external sheath,
  wherein the main sheath and the external sheath include different thermoplastic materials,
  wherein the main sheath is formed by extrusion,
  wherein the binder is deposited on the main sheath, and
  wherein the external sheath is extruded on the main sheath coated with the binder, wherein the external sheath is adhered to the main sheath by the binder.

2. The seismic streamer according to claim 1, wherein the biocide material includes copper metal.

3. The seismic streamer according to claim 2, wherein the external sheath includes between 75% and 85% copper metal.

4. The seismic streamer according to claim 1, wherein the biocide material includes powdered silver.

5. The seismic streamer according to claim 1, wherein the external sheath has a thickness of less than 1 mm.

6. The seismic streamer according to claim 1, wherein the main sheath has a thickness between 3 mm and 5 mm.

7. A method of manufacturing a section of a seismic streamer, wherein the section comprises:
   a main sheath formed using a thermoplastic material and
   an external sheath formed using a thermoplastic material loaded with a biocide material, the main sheath and the external sheath including different thermoplastic materials,
   wherein the method comprises:
      a step of extrusion of the main sheath,
      a step of depositing a binder on the main sheath, and
      a step of extruding the external sheath on the main sheath coated with the binder,
   wherein the external sheath is adhered to the main sheath by the binder.

* * * * *